(12) United States Patent
Münz et al.

(10) Patent No.: US 12,136,850 B2
(45) Date of Patent: Nov. 5, 2024

(54) ELECTRIC MOTOR

(71) Applicant: ebm-papst Mulfingen GmbH & Co. KG, Mulfingen (DE)

(72) Inventors: Martin Münz, Hollenbach (DE); Lucas Schellmann, Altkrautheim (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 190 days.

(21) Appl. No.: 17/979,818

(22) Filed: Nov. 3, 2022

(65) Prior Publication Data

US 2023/0143271 A1      May 11, 2023

(30) Foreign Application Priority Data

Nov. 5, 2021 (DE) .................... 10 2021 128 840.1

(51) Int. Cl.
    *H02K 1/16*      (2006.01)
    *H02K 1/26*      (2006.01)
    *H02K 3/48*      (2006.01)

(52) U.S. Cl.
    CPC ............. *H02K 1/165* (2013.01); *H02K 1/265* (2013.01); *H02K 3/48* (2013.01)

(58) Field of Classification Search
    CPC ........... H02K 1/165; H02K 1/265; H02K 3/48
    USPC .................................................. 310/216.069
    See application file for complete search history.

(56) References Cited

U.S. PATENT DOCUMENTS

| | | | | |
|---|---|---|---|---|
| 10,122,226 | B2 * | 11/2018 | Schmid | .................. H02K 13/04 |
| 11,784,528 | B2 * | 10/2023 | Suzuki | ..................... H02K 3/28 |
| | | | | 310/195 |
| 2001/0011851 | A1 * | 8/2001 | Asao | ........................ H02K 3/12 |
| | | | | 310/179 |
| 2006/0022550 | A1 * | 2/2006 | Otsuji | .................... H02K 3/522 |
| | | | | 310/194 |
| 2006/0214531 | A1 | 9/2006 | Wiker et al. | |
| 2011/0133580 | A1 | 6/2011 | Sugimoto et al. | |
| 2012/0313477 | A1 * | 12/2012 | Haga | ........................ H02K 3/28 |
| | | | | 310/215 |

(Continued)

FOREIGN PATENT DOCUMENTS

| | | |
|---|---|---|
| CN | 203911680 U | 10/2014 |
| DE | 102009016745 A1 | 6/2010 |

(Continued)

OTHER PUBLICATIONS

German Search Report dated Oct. 28, 2022 in corresponding German Application No. 10 2021 128 840.1.

(Continued)

*Primary Examiner* — Rashad H Johnson

(74) *Attorney, Agent, or Firm* — Harness, Dickey & Pierce, P.L.C.

(57) ABSTRACT

An electric motor has a rotor and a stator (1) with a first winding space (11) to receive a multiplicity of coil windings (12) wound from a winding wire. A second winding space (20), connected to the respective first winding space (11), is provided as a winding space extension of the first winding space (11) in order to receive at least one wire portion (21) of the winding wire. Two receiving pockets (24, 25), situated opposite one another in the circumferential direction (U), are formed in the at least one second winding space (20) in order to respectively receive the at least one wire portion (21) of the winding wire.

10 Claims, 2 Drawing Sheets

(56) References Cited

U.S. PATENT DOCUMENTS

| | | | | |
|---|---|---|---|---|
| 2012/0313628 A1* | 12/2012 | Van Nimmen | ........ | H02K 3/522 |
| | | | | 335/297 |
| 2014/0009029 A1* | 1/2014 | Schmid | ................. | H02K 23/00 |
| | | | | 29/596 |
| 2017/0070115 A1* | 3/2017 | Murase | .................... | H02K 3/18 |
| 2020/0287437 A1* | 9/2020 | Suzuki | .................... | H02K 3/18 |
| 2023/0143271 A1* | 5/2023 | Münz | ....................... | H02K 3/48 |
| | | | | 310/216.069 |

FOREIGN PATENT DOCUMENTS

| | | |
|---|---|---|
| DE | 102013111015 A1 | 4/2014 |
| DE | 112016006212 T5 | 9/2018 |

OTHER PUBLICATIONS

Extended European Search Report dated Mar. 23, 2023 in corresponding European Application No. 22202177.6.

* cited by examiner

ELECTRIC MOTOR

CROSS-REFERENCE TO RELATED APPLICATION

This application claims the benefit and priority of German Application No. 10 2021 128 840.1 filed Nov. 5, 2021. The entire disclosure of the above application is incorporated herein by reference.

FIELD

The disclosure relates to an electric motor, the stator and/or the rotor has mutually opposing receiving pockets to receive a wire portion of a winding wire.

BACKGROUND

A great number of electric motors are known from the prior art.

The rotors and/or stators of the electric motors usually have a multiplicity of teeth. A winding space is formed between two immediately adjacent teeth where a winding wire is wound around the teeth. Thus, this forms the coil windings.

However, it is possible for the coil windings or the winding wires to still slip at the beginning of a winding operation. This makes it impossible under certain circumstances to optimally utilize the space available in the winding space.

It is therefore an object of the disclosure to overcome the aforementioned drawbacks and provide an electric motor with available space in the winding spaces of the rotor and/or stator that can be optimally utilized. Also, the highest possible slot fill factor can be achieved.

SUMMARY

This object is achieved by the combination of features according to an electric motor including a rotor and a stator with a multiplicity of teeth. A first winding space, receiving a multiplicity of coil windings wound from a winding wire, is formed between two respective immediately adjacent teeth. A second winding space connected to the respective first winding space, receiving at least one wire portion of the winding wire, is formed adjacent to at least one first winding space. The second winding space has two mutually opposing side walls in a circumferential direction about an axis of rotation of the rotor that are spaced apart from one another by a first distance on a first side of the second winding space facing in the radial direction toward the first winding space. A second distance on a second side of the second winding space faces away from the first winding space in the radial direction. A third distance is in a center portion between the first side and the second side in the circumferential direction. The second distance is equal to or greater than the first distance, and the third distance is greater than the second distance. Two receiving pockets, situated opposite one another in the circumferential direction, are formed in the center portion of the side walls in order to respectively receive the at least one wire portion of the winding wire.

According to the disclosure, an electric motor has a rotor and a stator, each with a multiplicity of teeth. A first winding space, receiving a multiplicity of coil windings wound from a winding wire, is respectively formed between two immediately adjacent teeth, from the multiplicity of teeth. Thus, the rotor or the stator each has a multiplicity of first winding spaces. The immediately adjacent teeth is understood to mean that there is no other tooth between the teeth in the circumferential direction. The intention is for the winding wire, which can also be referred to as coil wire, to find space in the winding space during the winding process where the winding or coil wire is wound around the teeth. Thus, the space is filled out as optimally as possible. According to the disclosure, between the mutually adjacent teeth of the at least one first winding space, a second winding space, connected to the respective first winding space, is embodied as a winding space extension of the first winding space in order to receive at least one wire portion of the winding wire. The wire portion of the winding wire, arranged in the winding space, is preferably a wire portion at the beginning or at the end of a wire that is wound around a tooth. The second winding space has two mutually opposing side walls in a circumferential direction about an axis of rotation of the rotor. The walls are spaced apart from one another by a first distance on a first side of the second winding space facing, in the radial direction, toward the first winding space. A second distance, on a second side of the second winding space, faces away from the first winding space in the radial direction. A third distance is in a center portion between the first side and the second side. The second distance is equal to or greater than the first distance. The third distance is greater than the second distance. Thus, two receiving pockets, situated opposite one another in the circumferential direction, are formed in the center portion of the side walls in order to respectively receive the at least one wire portion of the winding wire.

In summary, an electric motor has a rotor and a stator, each with a multiplicity of first winding spaces to receive a multiplicity of coil windings wound from a winding wire. Furthermore, at least one second winding space, which is connected to a respective first winding space, is provided as a winding space extension of the first winding space in order to receive at least one wire portion of the winding wire. Two receiving pockets, situated opposite one another in the circumferential direction, are formed in the at least one second winding space in order to respectively receive the at least one wire portion of the winding wire in a preferably fixed manner.

Thus, it is possible, for example, for a wire portion of a winding or coil wire to be fixed in one of the receiving pockets and then wound around a tooth to fill the first winding space. The fixation of the wire in the receiving pocket prevents the wire from slipping.

The coil wires or the coil wire is enabled to be received in the first winding space in a space-saving manner. Also, the layer structure formed from the coil wire in the first winding space is minimized. A high fill factor, more particularly a high slot fill factor, of the first winding space is achieved as a result. Thus, the electrical efficiency of the electric motor is increased.

The coil or winding wire is already fixed to the rotor and/or stator during the winding process. Thus, the wire can no longer slip and a reliable winding is also achieved.

In one refinement of the electric motor, the side walls each have a first portion on the first side and transition from the respective first portion into the respective center portion via a plane that extends to the second side and is oblique to the radial direction. The side walls on the second side can each have a second portion and transition from the respective second portion into the respective center portion via a plane that extends to the first side and is oblique to the radial direction.

In a variant of the electric motor, the oblique plane extending to the second side and the oblique plane of a side wall extending to the first side together form a centering for centering the respective at least one wire portion of the winding wire in the respective receiving pocket.

Further, the oblique plane extending to the second side and the oblique plane of a side wall extending to the first side are at a fourth distance from one another. This is at a first end portion where the oblique planes merge into the center portion. The fourth distance is smaller than or equal to a diameter of the smallest winding wire that can be used for the rotor or the stator.

In addition, the oblique plane extending to the second side and the oblique plane of a side wall extending to the first side can be at a fifth distance from one another at a second end portion opposite the first end portion. The fifth distance is greater than or equal to a diameter of a largest winding wire that can be used for the rotor or the stator. Particularly, it is exactly equal to a diameter of the largest winding wire that can be used for the rotor or stator.

Also advantageous is a refinement where the oblique plane, extending to the second side, and the oblique plane, of a respective side wall extending to the first side, are arranged at a predetermined opening angle relative to one another. This enables a positive fit to be established with the winding wire and the winding wire to be fixed between the oblique planes.

The receiving pockets are preferably each designed to secure at least one wire portion of the winding wire against displacement in the radial direction, particularly by positive locking. Thus, the coil or winding wire is fixed in particular at a beginning of the wire and is held in the receiving pocket when the wire is wound around a respective tooth.

Furthermore, the receiving pockets can be designed asymmetrical to one another as a function of the winding direction.

The position of the second winding space can also vary depending on an intended winding direction. Accordingly, in another advantageous variant of the electric motor, a center axis, extending through the second winding space, is offset from a center axis extending through the first winding space. Thus, the second winding space is arranged asymmetrically or eccentrically with respect to the first winding space.

The features disclosed above can be combined as required, provided this is technically possible and they do not contradict one another.

Further areas of applicability will become apparent from the description provided herein. The description and specific examples in this summary are intended for purposes of illustration only and are not intended to limit the scope of the present disclosure.

DRAWINGS

Other advantageous refinements of the disclosure are characterized in the subclaims and/or depicted in greater detail below together with the description of the preferred embodiment of the disclosure with reference to the figures. In the drawings:

DETAILED DESCRIPTION

The figures are schematic examples. The same reference symbols in the figures indicate the same functional and/or structural features.

Figure 1:
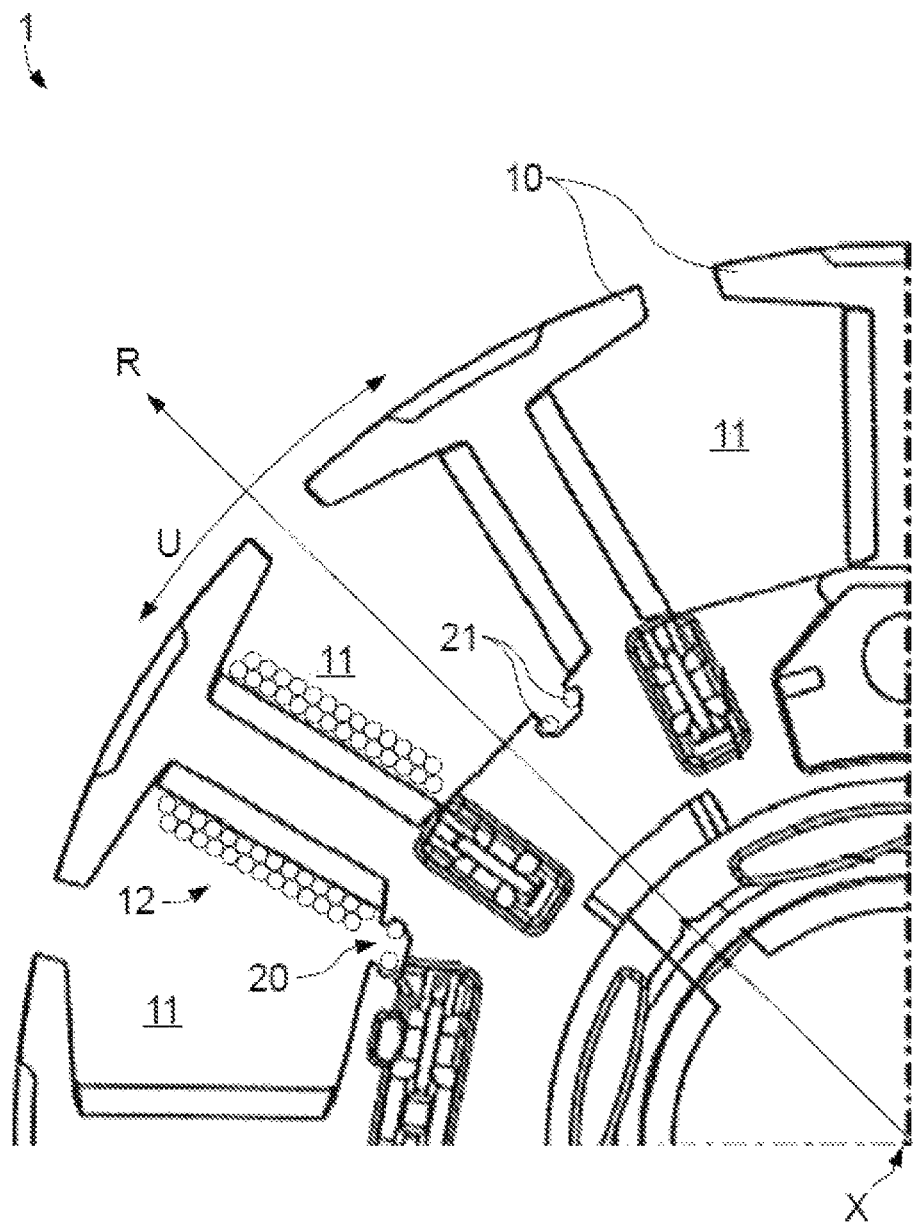
FIG. 1 is a section view of a stator.

FIG. 1 shows a section of an electric motor and, more precisely, a quarter of a stator 1 as a section of an electric motor. The quarter has three first winding spaces 11 between the teeth 10. The entire stator 1 has a total of twelve first winding spaces 11 between its teeth 10. In the quarter that is depicted and in the entire stator 1, two second receiving spaces 20 are formed between two respective directly adjacent teeth 10.

In addition to the stator 1, that is shown as an example, other rotors or stators with other division ratios are also possible. For example, rotors and/or stators with 6, 9, or more teeth and winding spaces can also be provided.

Figure 2:
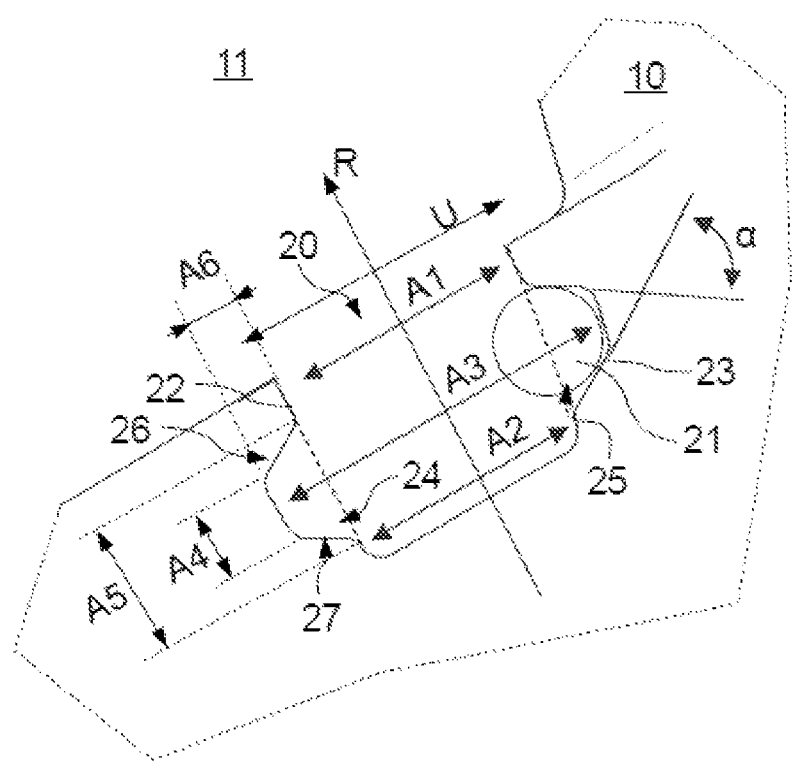
FIG. 2 is a section view of a second winding space.

During winding of the coil windings 12, the winding wire can first be guided with its wire portion 21 into the second winding spaces 20. The wire portion 21 is secured in a receiving pocket, for example, the receiving pocket 25, as shown in FIG. 2, against displacement along the radial direction R.

The winding wire can then be guided into the first winding space 11 belonging to the second winding space 20 and wound around the adjacent tooth 10.

By virtue of the fixation in the second winding space 20, the winding wire cannot slip in the first winding space 11. Also, the winding wire can be guided tightly and under tension, more particularly, as it is wound around the tooth 10.

This not only makes reliable winding possible, but also tight winding, which leads to a high fill factor of the winding wire in the first winding space 11.

FIG. 2 shows an enlarged section of a rotor or stator 1, with a second winding space 20, that can be a section of the stator 1 according to FIG. 1.

Visible in FIG. 2 are the receiving pockets 24, 25 that are situated opposite one another in the circumferential direction U. Each pocket receives at least one wire portion 21. In the present case, exactly one wire portion 21, of the winding wire, can be arranged and secured by the arrangement against displacement along the radial direction R.

The receiving pockets 24, 25 are preferably formed so that the distance A3 between the side walls 22, 23 of the second winding space 20, in the center portion, is greater than the distance A2 and A1. A2 is at a second distance here at a radially inner side. The distance A1 is at a first distance, here at an radially outer side.

The preferably form-fitting fixation can be achieved particularly by virtue of the oblique planes 26, 27 of each receiving pocket 24, 25 extending toward one another. The oblique planes 26, 27 also serve to center and fix the wire portion 21 of the winding wire in the respective receiving pocket 24, 25.

For this purpose, the oblique planes 26, 27, of a respective receiving pocket 24, 25, are at a distance A4 from one another at their end adjoining the center portion of the pocket. Also, the oblique planes 26, 27 are at a distance A5 from one another at their respective opposite end. The distance A5 is selected such that a wire portion 21 of a winding wire is able to penetrate into the respective receiving pocket 24, 25 and is clamped between the oblique planes 26, 27, in the respective receiving pocket 24, 25, due to the convergence from the distance A5 to the distance A4.

For this purpose, the receiving pockets 24, 25 also each have a depth A6. The depth A6 is preferably greater than or equal to a radius of a largest winding wire that can be used for the stator 1.

The depth A6 and the distances A4 and A5 also have the effect that the oblique planes 26, 27 extend toward one another at an opening angle α. The opening angle α is selected such that the wire portion 21 can be fixed in the respective receiving pocket 24, 25 in a form-fitting manner.

The disclosure is not limited in its execution to the abovementioned preferred exemplary embodiments. Rather, a number of variants are conceivable which make use of the illustrated solution even in the form of fundamentally different embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric motor comprising:
    a rotor and a stator, the rotor and/or the stator has a multiplicity of teeth;
    a first winding space, for receiving a multiplicity of coil windings wound from a winding wire, is formed between two respective immediately adjacent teeth;
    a second winding space, connected to the respective first winding space to receive at least one wire portion of the winding wire, is formed adjacent to at least one first winding space;
    the second winding space has two mutually opposing side walls in a circumferential direction about an axis of rotation of the rotor that are spaced apart from one another by a first distance on a first side of the second winding space facing in the radial direction toward the first winding space;
    a second distance on a second side of the second winding space facing away from the first winding space in the radial direction;
    a third distance in a center portion between the first side and the second side in the circumferential direction;
    the second distance is equal to or greater than the first distance, and the third distance is greater than the second distance; and
    two receiving pockets, situated opposite one another in the circumferential direction, are formed in the center portion of the side walls in order to respectively receive the at least one wire portion of the winding wire.

2. The electric motor as set forth in claim 1, wherein the side walls each have a first portion on the first side and transition from the respective first portion into the respective center portion via a first plane that extends to the second side and is oblique to the radial direction.

3. The electric motor as set forth in claim 1, wherein the side walls on the second side each have a second portion and transition from the respective second portion into the respective center portion via a second plane that extends to the first side and is oblique to the radial direction.

4. The electric motor as set forth in claim 3, wherein the oblique first plane, extending to the second side, and the oblique second plane, of a side wall extending to the first side, together define a centering for centering the respective at least one wire portion of the winding wire in the receiving pocket.

5. The electric motor as set forth in claim 3, wherein the oblique first plane, extending to the second side, and the oblique second plane, of a side wall extending to the first side, are positioned at a fourth distance from one another at a first end portion where the oblique first and second planes merge into the center portion, the fourth distance being smaller than or equal to a diameter of the smallest usable winding wire.

6. The electric motor as set forth in claim 5, wherein the oblique first plane, extending to the second side, and the oblique second plane, of a side wall extending to the first side, are at a fifth distance from one another at a second end portion opposite the first end portion, the fifth distance being greater than or equal to a diameter of the largest usable winding wire, particularly equal to a diameter of the largest usable winding wire.

7. The electric motor as set forth in claim 1, wherein the oblique first plane, extending to the second side, and the oblique second plane, of a respective side wall extending to the first side, are arranged at a predetermined opening angle relative to one another, that enables a positive fit to be established with the winding wire and the winding wire to be fixed between the oblique first and second planes.

8. The electric motor as set forth claim 1, wherein the receiving pockets are each designed to secure at least one wire portion of the winding wire against displacement along the radial direction, by positive locking.

9. The electric motor as set forth in claim 1, wherein the receiving pockets are designed asymmetrical relative to one another.

10. The electric motor as set forth in claim 1, wherein a center axis extending through the second winding space is offset from a center axis extending through the first winding space, so that the second winding space is arranged asymmetrically with respect to the first winding space.

* * * * *